United States Patent [19]

Robertson

[11] Patent Number: 4,883,291
[45] Date of Patent: Nov. 28, 1989

[54] DOT MATRIX FORMED SECURITY FONTS

[75] Inventor: John A. Robertson, Chillicothe, Ohio

[73] Assignee: Telesis Controls Corporation, Chillicothe, Ohio

[21] Appl. No.: 192,842

[22] Filed: May 11, 1988

[51] Int. Cl.⁴ ............................................. B42D 15/00
[52] U.S. Cl. .................................... 283/117; 340/756; 400/104; 400/121; D18/24; 380/55
[58] Field of Search ............... 400/103, 104, 121; D18/24–26; 380/54–56; 283/117; 340/752, 735, 790, 756; 382/18, 30

[56] References Cited

U.S. PATENT DOCUMENTS

| | | | |
|---|---|---|---|
| 2,350,893 | 6/1944 | Hofgaard | 400/104 |
| 3,044,696 | 7/1962 | Feissel | D18/26 X |
| 3,678,497 | 7/1972 | Watson | D18/26 X |
| 4,039,066 | 8/1977 | Quigley | 400/124 |
| 4,218,673 | 8/1980 | Yoshida | 382/18 |
| 4,506,999 | 3/1985 | Robertson | 400/121 |

Primary Examiner—Paul T. Sewell
Attorney, Agent, or Firm—Mueller and Smith

[57] ABSTRACT

Fonts of characters of an alphabetic and numerical set thereof are described wherein each character of a set is formed from a dot-like pixel matrix and exhibits a predetermined constant and equal number of pixels. Any illegal alteration of the characters of the font set is avoided by forming the dot-like pixels defining a character in permanent fashion as by indentation in the surface of the article to be marked such that pixels cannot be erased, but only added. The pixels within the top and bottom three rows of each character of the font sets form a pattern unique to that character so that the identity of the character may be recovered if a portion of it is lost. A security encryption technique becomes available through the use of characters from two font formats.

30 Claims, 4 Drawing Sheets

DOT MATRIX FORMED SECURITY FONTS

BACKGROUND

With the increasing occurrence of counterfeit or illegal products, industry has been seeking techniques for generating permanent identification of components or parts. When conventionally applied, character strings representing serial numbers or like product identification can be altered and serialized sets of them may be mimicked. Accordingly, when such false or illegal character strings of identification are combined with fully copied trade dress, trademarks and product shaping and sizing, counterfeiting entities can glean substantial illegal profits. These profits are at the loss of the genuine producer which also incurs losses due to warranty repairs carried out with respect to the apparently valid products and losses of good will as may be associated with the distribution of lower quality counterfeit merchandise. Further liabilities may be imposed upon industry where successfully counterfeited products, having apparently legal serial number or the like identification, exhibit defects which become the subject matter of legal liability. It is important for the original and genuine manufacturer to have a technique for encrypting its serial number identification procedures and the like such that the counterfeiter cannot readily carry out description procedures. Of course, a secure encrypting system for progressive numbering or identification will be of considerable value in the production of lottery tickets and the like.

Permanent marking of products with indented or stamped characters has been utilized in industry, but until recently, this approach has been considered of limited value, particularly where serial number identification is required in conjunction with large volume production. Classic stamping approaches have, for example, utilized dies which carry a collection of full formed characters. These characters may be positioned in a die carrier which is manipulated to define a necessarily short message. Over the recent past, a computer driven system for rapidly creating substantial character strings by pin indentation has been successfully introduced to industry. This system, marketed under the trade designation "PINSTAMP" and described in U.S. Pat. No. 4,506,999 utilizes marker pins which are controllably actuted to form dot-like indentation defined pixels within a given matrix of available pixels to form characters. The latter characters being permanently indented in the product surface marked, are removable essentially only by grinding or like procedures. For most applications of these character strings, however, there further exists a requirement that the numerical and alphabetical characters of a given message string so marked upon a product surface be man readable. Thus, where such products are stolen, a valid serial number may be altered by the addition of indentations to change character designations, for example, from a "P" to a "R".

Another aspect of product identification or marking, particularly associated with the noted indentation techniques, is concerned with defective original marking. For example, where incorrect alignment occurs between the piecepart marking surface and the marking mechanism, a significant portion of a given character may not be formed, resulting in a loss of readability. Characteristically, the portions of the characters which are lost due to defective stamping techniques tend to occur either at the top or bottom region of the character configuration. Such losses also may occur in conjunction with product thievery where attempts are made to remove the characters of a character string by grinding procedures or the like. Very often, authorities are able to recover at least a portion of the originally indented character identification information, for instance by using chemical etching procedures or the like. Thus, if particular portions of a formed character are sufficiently unique in and of themselves, such analytic identification techniques become more promising and enjoy substantially more reliable evidenciary value.

SUMMARY

The present invention is addressed to a unique font of characters formed of dot-like pixels available from a matrix wherein all character forms are developed with the same number of pixels. Thus, modification of a given character by the addition of pixels destroys its condition of legality. Where the pixels are formed by dot-indentation techniques, any other form of character alteration, as by erasure, essentially becomes a practical impossibility for a would-be thief.

Another particular feature of the invention resides in the combination of an article of manufacture having a surface bearing identifying characters of an alphabetical and numerical set produced in a form adapted to be recognized by human vision in accordance with their shape and orientations, the characters being formed of character shape defining pixels selected from a predetermined available matrix having a predetermined number of rows of pixel positions extending from a top row to a bottom row, wherein each character is formed as a unique combination of a predetermined constant and equal number of pixels.

Still another particular feature of the invention is the font of characters of an alphabetical and numerical set thereof as represented in the embodiment of FIG. 1 as well as the embodiment of FIG. 6.

Another particular feature of the invention provides a combination of an article of manufacture having a surface bearing a message string of identifying characters produced in a form adapted to be recognized by human vision in accordance with the orientations and shapes thereof, the characters of the string being formed of character shape defining pixels selected from a matrix having rows of pixel positions extending from a top row to a bottom row, wherein at least one character of the string is an encripting character selected from a first character set, each character of which is configured as a unique combination of a first predetermined constant and equal number of these pixels, the position of the encripting character within the string being selected in accordance with a secret encription procedure; the remainder of the characters of the string selected from a second character set, each character of which is configured as a unique combination of a second predetermined constant and equal number of pixels.

Another particular aspect of the invention provides a method for marking the surface of an article with a secure character message string which comprises the steps of:

selecting a predetermined number of characters of the message string from a first font having characters which are of an alphabetical and numerical set produced in a form adapted to be recognized by human vision in accordance with their shape and orientations, the characters being configured as a unique combination of a predetermined constant and equal first number of pixels arranged in rows from the top to the bottom of the characters and wherein each of the characters exhibits a unique, character identifying pattern within a predetermined number of the rows; and forming the pixels defining the selected characters upon the surface by creating dot-like indentations within the surface.

Other aspects of the invention will, in part, be obvious and will, in part, appear hereinafter.

The invention, accordingly, comprises the articles, apparatus, and method possessing the construction, steps, combination of elements and arrangement of parts which are exemplified in the following detailed disclosure.

For a fuller understanding of the nature and objects of the invention, reference should be had to the following detailed description taken in connection with the accompanying drawings.

DETAILED DESCRIPTION OF THE INVENTION

Figure 1:
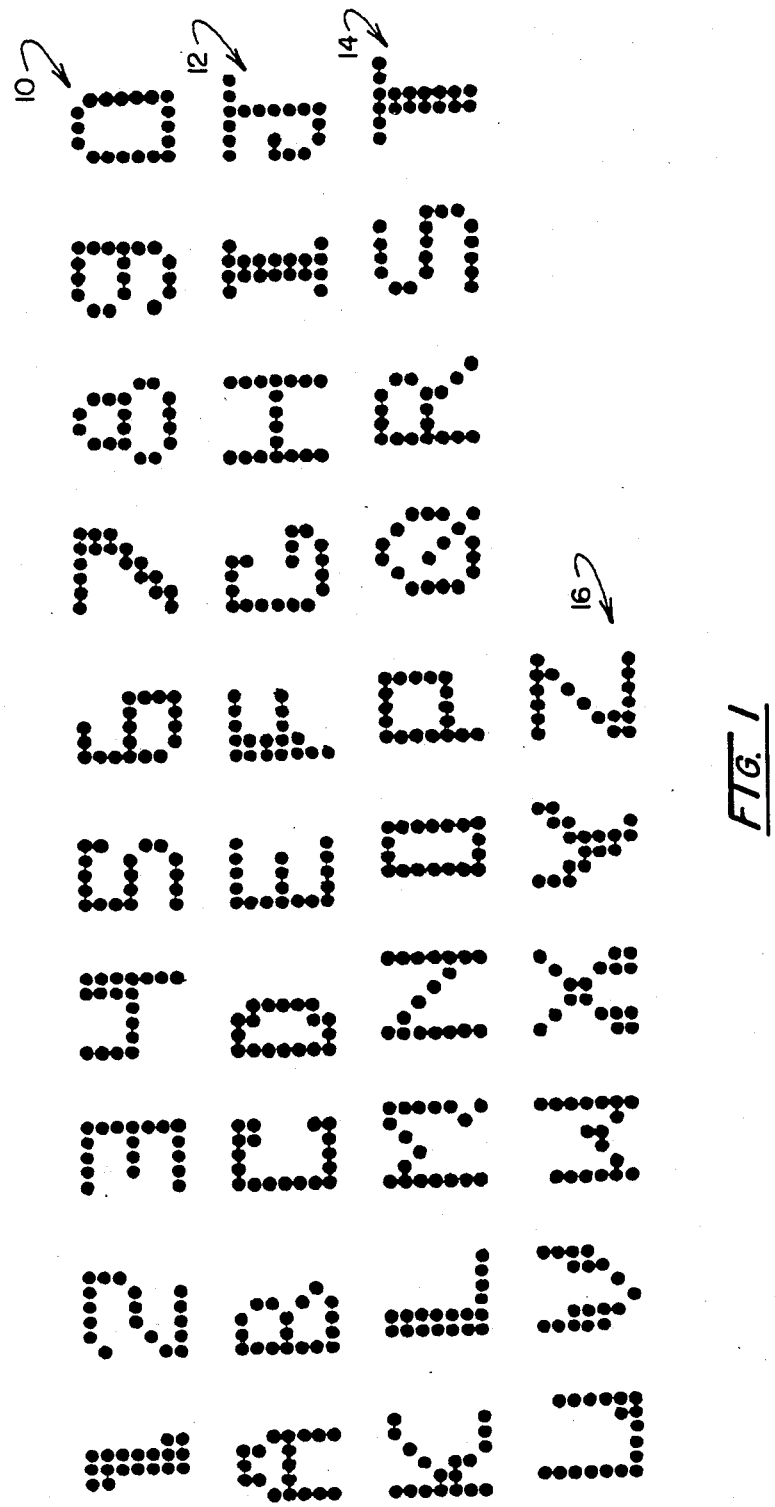
FIG. 1 shows a font of characters of an alphabetical and numerical set thereof according to the invention.

Referring to FIG. 1, a font of characters of an alphabetical and numerical set thereof is revealed. In the figure, it may be observed that each of the characters is formed of pixels as represented in dot form. Preferably, these pixels are developed by an indentation technique such that described in U.S. Pat. No. 4,506,999. While additional pixels may be added to the character structure, the erasure of existing such pixels becomes a practical impossibility. The numerical set of characters of the font are represented at row 10 and may be seen to be produced in a form adapted to be recognized by human vision in accordance with their orientations and shapes. Note that the numerals 1, 2, 3, 4, 5, 6, 7, 8, 9, and 0 are represented at row 10. Similarly, the alphabet is represented in rows 12-14 as including the letters A, B, C, D, E, F, G, H, I, J, K, L, M, N, O, P, Q, R, S, T, U, V, W, X, Y, and Z in appropriate sequence. Each of the characters in rows 10, 12, 14, and 16 is formed of a predetermined constant and equal number of pixels, to wit, 18, and the characters themselves are formed of pixels available from a matrix. Looking additionally to FIG. 2, a graphic representation of the 6×7 matrix from which the characters are derived is set forth generally at 18. The matrix is shown carrying the number "2" and is illustrated having six columns A-F and seven rows, 1-7. Looking in particular to the number "2" in the matrix figure, it may be seen that the number includes positions B-F in row 1, positions A and F in row 2, position F in row 3, positions C, D, and E in row 4, position B in row 5, position A in row 6, and positions A-E in row 7.

Another unique aspect of each of the characters within rows 10, 12, 14, and 16, resides in their architecture wherein each exhibits a unique, character identifying pattern of pixels within a predetermined number, here 3, of the rows of matrix 18. Thus, for the number 2, a unique pattern of pixels exists within rows 1 to 3. Additionally, each character exhibits a unique, identifying pattern of pixels within a predetermined number of rows of the matrix extending from the bottom row, i.e rows 7, 6, and 5. This arrangement is particularly valuable in the case of characters formed by stamping or dot indentation techniques. Very often, the stamp or marking apparatus is not appropriately aligned with the workpiece being stamped. Thus, the entire character may not be formed. Generally, the failure due to misalignment will be manifested in a loss at either the top or bottom of a character. Accordingly, where given character can subsequently be identified by looking to either the top three rows or bottom three rows of their format, the information contained in a message string positioned upon an article of manufacture or piecepart can be recovered. The three rows at the top of the matrix and the three rows at the bottom are unique for each character in that there is no index point or position required to achieve such uniqueness. In effect, the top and bottom three rows of the matrix defined characters are "locally" unique. Thus, where a character has been only partially formed, the information represented by it may be recovered or where it has been ground away, in many instances, at least a portion, i.e. the top or bottom three rows may be recovered by chemical or other technical techniques for identification.

Figures 2, 3:
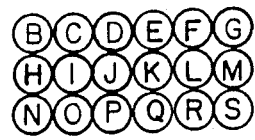
FIG. 2 is a schematic representation of a matrix of available pixels employed in producing the characters shown in FIG. 1.
FIG. 3 is a template employed in verifying the unique pattern of pixels in each character within three rows thereof extending from the top and bottom of the character format.

The uniqueness of the top three rows, 1, 2, and 3 of each character, and the bottom three rows, 5, 6, and 7 of each character can be verified by employing a template as represented in FIG. 3. This template is placed over the top three of bottom three rows of the matrix from which the characters are formed. Positioning of the template is such that the top left of the template is justified into an assumed matrix, for instance, that of FIG. 2. Similarly, the top left template pixel is justified into an assumed matrix for the bottom three rows. Note that the remaining cells of the template of FIG. 3 are consecutively labelled B-S. Each of these cell locations is assigned a binary "weight" in accordance with its alphabetically progressive location. Looking momentarily to Table 1, it may be seen that location B is given weight 1 while location S is given the ascending binary valuation shown in decimal form as 131,072.

TABLE 1

| Location | Weight |
|---|---|
| B | 1 |
| C | 2 |
| D | 4 |
| E | 8 |

TABLE 1-continued

| Location | Weight |
|---|---|
| F | 16 |
| G | 32 |
| H | 64 |
| I | 128 |
| J | 256 |
| K | 512 |
| L | 1,024 |
| M | 2,048 |
| N | 4,096 |
| O | 8,192 |
| P | 16,384 |
| Q | 32,768 |
| R | 65,536 |
| S | 131,072 |

Figure 4:
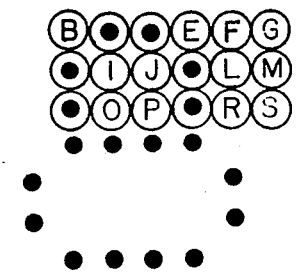
FIG. 4 shows an application of the template of FIG. 3 with respect to a numbered character formed according to the invention.

Referring to FIG. 4, the positioning of the template of FIG. 3 over the upper three rows of character 8 is represented. The calculated "weight" of the first three rows of this character 8 then may be computed as the sum of the weights of template cells B-G, or 2+4 for the first row combined with the weights for cells H and K in row 2 or 64+512 and, finally, the weight of the cells N and Q in row 3 or 4096+32,768. The total weight value for the top three rows of the characters 8 then becomes 37,446.

Figure 5:
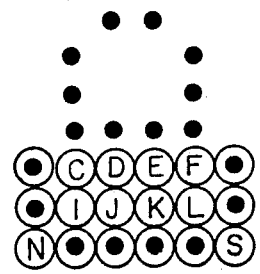
FIG. 5 is a representation of the application of the template of FIG. 3 with respect to an alphabetical character formed according to the font architecture of the invention.

Applying the template represented in FIG. 3, for example, to the lower three rows of another character, for example "S" will represent still another unique weighting. Looking to FIG. 5, the template of FIG. 3 is shown positioned over the lower three rows of the character, 8. Summing the cell weights from the template, it may be observed that in row 5, cells B and G have values of 1 and 32, while in row 6, cells H and M have values of 64 and 2048. Finally, in row 7, the cells O, P, Q, and R have a value representing the sum of 8192+16,384+32,768+65,536. This results in a total weighting for all pixels in the lower three rows of character 8 amounting to the value, 125,025. Referring to Table 2, a compilation of the weighting sums for top rows 1-3 and bottom rows 5-7 for each of the characters of FIG. 1 is revealed. It may be observed from the tabulation that, while some identities may occur in the sums associated with rows 1 and 2, and 5 and 6, the summations of the three rows for top and bottom of the characters remains unique.

TABLE 2

| | Top Rows 1-3 | | | Bottom Rows 5-7 | | |
|---|---|---|---|---|---|---|
| Character | Sum Row 1 | Sum Rows 1 & 2 | Sum Rows 1 & 2 & 3 | Sum Row 5 | Sum Rows 5 & 6 | Sum Rows 5 & 6 & 7 |
| F | 31 | 223 | 12,511 | 3 | 67 | 4,163 |
| P | 31 | 1,119 | 70,751 | 31 | 95 | 4,191 |
| 7 | 63 | 3,135 | 199,743 | 12 | 396 | 12,684 |
| V | 33 | 2,145 | 211,041 | 19 | 659 | 17,043 |
| D | 7 | 839 | 37,703 | 9 | 841 | 29,413 |
| T | 63 | 831 | 49,983 | 12 | 780 | 49,932 |
| J | 63 | 575 | 33,343 | 9 | 585 | 57,929 |
| 1 | 7 | 455 | 25,031 | 6 | 902 | 58,246 |
| g | 30 | 1,118 | 70,750 | 16 | 1,104 | 58,448 |
| I | 15 | 399 | 24,975 | 6 | 390 | 61,830 |
| 0 | 15 | 591 | 37,455 | 9 | 585 | 62,025 |
| 5 | 31 | 1,119 | 5,215 | 16 | 1,040 | 62,480 |
| B | 7 | 583 | 37,447 | 9 | 1,097 | 62,537 |
| A | 14 | 654 | 70,286 | 17 | 1,105 | 70,737 |
| Y | 33 | 3,169 | 113,761 | 12 | 780 | 99,084 |
| 6 | 7 | 71 | 4,167 | 17 | 1,105 | 123,985 |
| 8 | 6 | 582 | 37,446 | 33 | 2,145 | 125,025 |
| G | 15 | 591 | 4,687 | 57 | 2,169 | 125,049 |
| E | 31 | 95 | 4,191 | 2 | 65 | 127,041 |
| 2 | 62 | 2,174 | 133,246 | 2 | 66 | 127,042 |
| 3 | 31 | 1,055 | 66,591 | 16 | 1,040 | 128,016 |
| C | 31 | 1,631 | 5,727 | 1 | 1,089 | 128,065 |
| 0 | 14 | 1,102 | 70,734 | 17 | 1,105 | 128,081 |
| S | 30 | 94 | 4,190 | 32 | 2,080 | 129,056 |
| 4 | 49 | 3,185 | 203,889 | 32 | 2,080 | 133,152 |
| R | 15 | 1,103 | 70,753 | 9 | 1,097 | 136,265 |
| M | 49 | 2,801 | 154,353 | 33 | 1,121 | 136,289 |
| H | 33 | 2,145 | 137,313 | 33 | 2,145 | 137,313 |
| N | 33 | 2,273 | 153,825 | 49 | 2,161 | 137,329 |
| W | 32 | 2,144 | 137,312 | 45 | 3,309 | 138,477 |
| Q | 12 | 1,164 | 136,332 | 41 | 1,129 | 189,545 |
| X | 33 | 1,185 | 50,337 | 18 | 3,282 | 212,178 |
| K | 49 | 625 | 21,105 | 7 | 327 | 233,799 |
| Z | 63 | 1,087 | 33,855 | 2 | 194 | 258,242 |
| L | 3 | 195 | 12,483 | 3 | 195 | 258,243 |
| U | 1 | 2,113 | 137,281 | 33 | 3,169 | 261,217 |

Figure 6:
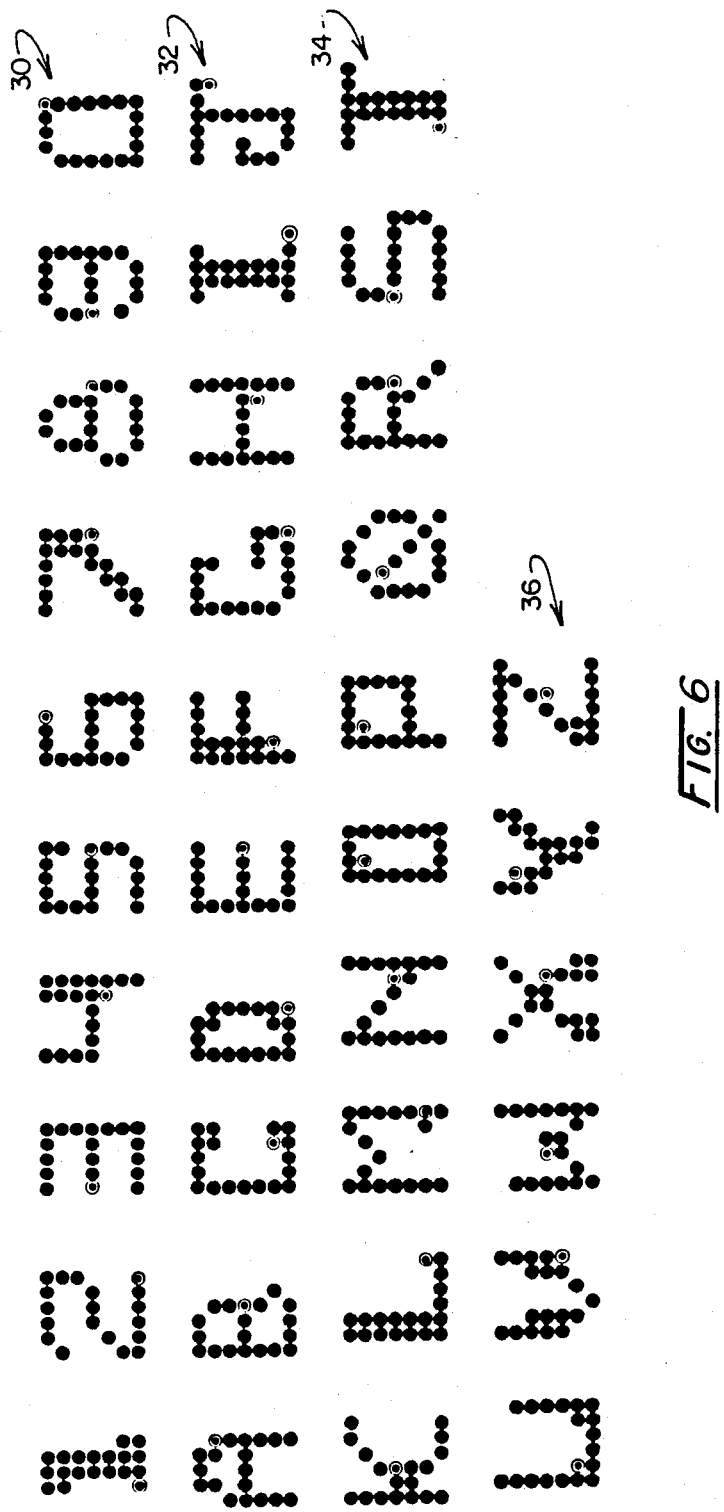
FIG. 6 illustrates a font of characters of an alphabetical and numerical set according to the invention.

Referring to FIG. 6, another font of characters of an alphabetical and numerical set thereof is represented. These characters are formed of pixels selected from a 6×7 matrix as represented at 18 in FIG. 2 and are, as before, formed of a predetermined constant and equal number of pixels, here 19. The characters shown in FIG. 6 are quite similar to those represented in FIG. 1 with the addition of one pixel which, for convenience of illustration, is identified as a bulls-eye within each of the characters. Note that the characters are in a form adapted to be recognized by human vision in accordance with their orientations and shapes. In this regard, the numbers 1, 2, 3, 4, 5, 6, 7, 8, 9, 0 are represented in row 30, while row 32 includes alphabetic characters A, B, C, D, E, F, G, H, I, J, row 34 includes the alphabetic characters K, L, M, N, O, P, Q, R, S, T, and row 36 includes the alphabetic characters U, V, W, X, Y, Z. Each of the characters of FIG. 6 further meets the earlier-described criterion wherein the top three rows of pixels and bottom three rows of pixels exhibit a unique, character identifying pattern such that the identification of the characters can be recovered even though only one or the other of those groupings of matrix rows are recoverable.

The availability of two distinct fonts of characters as represented in conjunction with FIGS. 1 and 6 permits the facile development of encryptable message strings, the legality of which essentially can only be ascertained by the originator. With such an arrangement, message strings of the characters are created which include predominantly one or the other of the font structures represented in FIGS. 1 and 6 along with a cipher or encrypting character or characters of the other non-predominant font architecture. Thus, serial numbers may be created with a character having a different font structure which is located within the message string at a position depending upon some predetermined encryption procedure. The latter procedures may be quite involved or, may be relatively simple, as availed by a modulo approach. The latter approach may be represented, for example, by the following two successive Ser. Nos. A1234; A1235. By assigning arbitrary values to the characters of the message string represented by the serial numbers, one character may be elected in accordance with a modulo procedure. For example, arbitrary values may be assigned for each of the character designations within the above exemplary serial numbers as follows: A=18, 1=77, 2=3, 4=111, 5=60, 3=12.

Figure 7:
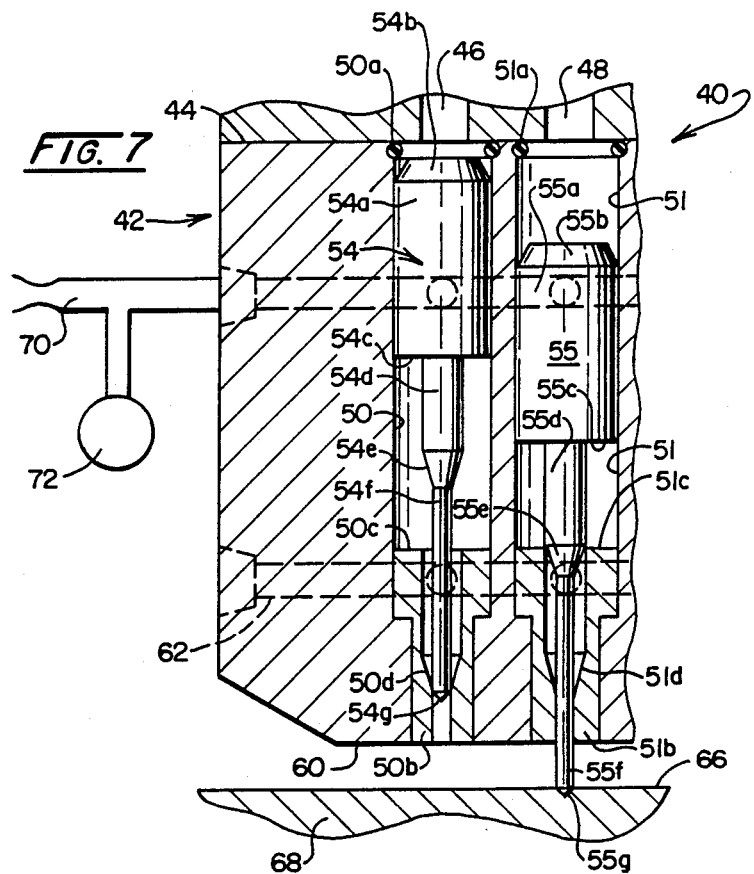
FIG. 7 is a partial sectional view of two marker pin components and associated chambers of an apparatus which may be employed to form the characters of FIGS. 1 and 6.

With the values thus assigned, the serial number A1234 has a value amounting to 2+18+77+3+111+12 or 221. Similarly, the second serial number will have value derived as the sum of 18+77+3+12+60 or 170. Under a modulo approach, these numbers are divided by the number of characters in the Ser. No. or 5. Carry will result having a value between 0 and 4 and so the latter carry represents the location of the elected different font character. In the instant example, 221÷5 represents a carry of 1 and thus, the character position "1" of the first serial number would be given a different font architecture. By the same procedure, the value 170 is equally divided by 5 and thus location "0" or the "A" character of the second serial number is elected as having a different font architecture. Essentially, the only way a thief or counterfeiter can break the encryption is to know the above procedure. Thus, serial numbering may become secure and may be developed without undue difficulty in view of the computer driven marking procedures available. One such procedure providing dot-like indentations in the surface of the article to be marked is described in the noted U.S. Pat. No. 4,506,999 by Robertson issued Mar. 26, 1985, and incorporated herein by reference. The marking technique disclosed therein employs an array, for example of 7 marker pins, which are retained in a marker head and are pneumatically driven and retrieved from a surface to be marked. Referring to FIG. 7, a partial sectional view of such a head structure and marker pin arrangement is shown generally at 40. The arrangement 40 includes a head structure 42 which is abuttably united at its upper surface 44 with a manifold shown partially at 44. Solenoid driven valves control the entry of drive air through channels as at 46 and 48 within manifold 44. These channels 46 and 48 respectively communicate with associated pin retaining chambers as at 50 and 51. The pneumatically secure association of each of the chambers 50–51 at surface 44 is achieved by the provision of O-rings as at 50a–51a which are located within appropriate grooves. These O-rings and the association between surface 44 and the lower abutting surface of head 42 provide, upon assembly, an abutting position for the uppermost surfaces of an array of marker or indenter pins as at 54 and 55.

Each of the marker pins as at 54–55 are formed of a relatively high strength steel, for example, a type M2 high speed tool steel having a hardness of RHC-65. Each marker pin is structured having a piston portion as at 54a–55a which extends between a chamferred upper abutting surface 54b–55b and a lower return drive surface 54c–55c. The piston portion 54a–55a is configured having a diameter selected to achieve a sliding movement within the chambers as at 50 and 51 to provide pneumatically actuated reciprocal drive to the marking pin arrangement. Extending integrally from the center of the piston portions 54a–55a are cylindrical first stem portions 54d–55d which, in turn, extend to limit surfaces 54e–55e serving to provide an abutting or travel restraining portion limiting the downward travel or throw of the marker pins. Extending from these limit surfaces 54e–55e are marker pins shafts 54f–55f of lesser diameter than stem portions 54d–55d which terminate in conically shaped character component forming surfaces 54g–55g. Surfaces 54f–55f serve to form the discrete pixel or element forming a character of the message produced by the assembly 40.

Each of the chambers as at 50–51 is configured to retain a chamber insert 50b–51b extending to a confronting surface 60. The chamber inserts are configured having upper flat abutting surface as at 50c–51c and a lower, conically shaped seating surface as at 50d–51d. Above the surfaces 50d–51d the inserts are configured to receive the corresponding marker pin stem portions, the lower portion of each insert being formed having a lower bore of diameter suited to receive the stem portions of each marker pins in a slideable but somewhat pneumatically secure fashion.

Marker pin 54 is shown in an operational ready orientation wherein its abutting surface 54g is adjacent O-ring 50a at the upper access surface 44. The pin is retained in this operational ready position by virtue of a return pneumatic pressure introduced through a return conduit 62 which is coupled pneumatically in parallel to the lower regions of all chambers as at 50–51. Thus introduced, this pneumatic pressure enters a somewhat pressure secure region identified between the return drive surfaces as at 54c and the seal between the pin stem portions and lower bore of the chamber inserts. The pressure provided from the return conduit 62 is selected such that it may be overcome by a marker pin pneumatic drive force emanating from conduits as at 46 and 48 but remains of sufficient value to achieve a quick recovery to the operational ready position represented by pin 54 following a indentation forming operation.

The figure shows a marking orientation for pin 55 wherein a pixel or character component is formed within surface 66 of piecepart or article 68 by character component surface 55g. A monitoring conduit 70 along with a transducer 72 are in association with the uppermost region of each of the chambers as at 50–51 for purposes of monitoring the performance of the pins with respect to broken stem components and the like.

Figure 8:
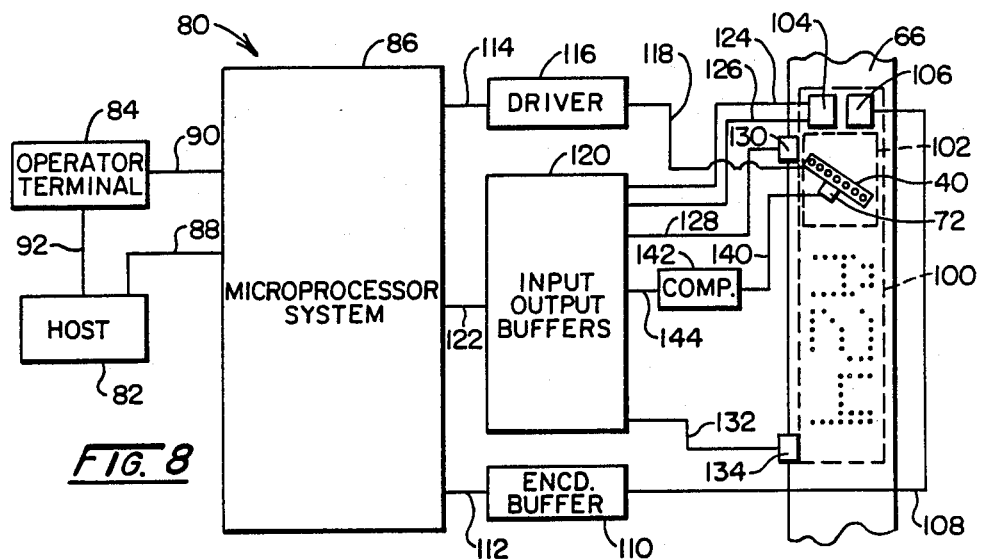
FIG. 8 is a schematic diagram of a control system which may be utilized in conjunction with the apparatus represented in FIG. 7.

Referring to FIG. 8, a schematic representation of a control over a head as at 40 is represented in general at 80. The control arrangement 80 may be assessed from a general computer facility and/or through an operator terminal. This approach is represented in the figure by respective blocks 82 and 84. Generally, input to microprocessor components of a control system as represented at block 86 is provided in conventional serial fashion through the utilization of RS232 interfacing. Of course, other interfacing may be employed. An operational relationship between the host facility at block 82 and the terminal at block 84 is represented by line 88 while direct access of these function with the microprocessor system is represented by lines 90 and 92. Microprocessor system 86 operates to provide control over a marker assembly represented in phantom at 100 which is seen to be positioned over earlier-described surface 66 of the piecepart 68 to be marked. Assembly 100 includes the head arrangement 40 shown here in schematic fashion as including, for example, seven pins in a linear array canted to provide for suitable character height. Pin array 40 is mounted upon a movable carriage represented by dashed block 102 which is controllably driven, for example, by an air motor and related control represented at block 104. The position of the carriage 102 and associated array 40 is encoded by a position encoder represented at block 106. Position information from encoder 106 is relayed to the microprocessor system 86 as represented by a line 108, input encoder buffer 110, and line 112. Similarly, pneumatic drive control into the pins of array 40 emanating from the microprocessor based system 86 is provided as represented by line 114, a drive circuit represented at block 116, and communicating lines as represented by line 118 to the array 40.

Communication between the microprocessor system 86 and a variety of operational components is provided through input/output buffers and associated networks as represented at block 120 and line 122. These buffers communicate, for example, as represented by lines 124 and 126 with the drive control represented at block 104. Additionally, a buffer line 128 is seen extending to such devices as a limit switch as represented at block 130 which responds to one limit of the movement of carriage 102. Similarly, a line 132 responds to a limit detector represented at block 134 having an output corresponding with the extended traverse of carriage 102. Pin breakage as monitored by transducer 72, now represented in block form, may be monitored as represented at line 140 which is associated with a comparator network represented at block 142 and with microprocessor via line 144. Other functions associated with the microprocessor system 86 and the buffer arrangement 120 are described in detail in the noted U.S. Pat. No. 4,506,999.

With the form of drive shown, it may be observed that sequential serial numbers may be produced incorporating the dual security fonts described above and carrying out desired encrypting procedures.

Since certain changes may be made in the above-described method, combination and apparatus without departing from the scope of the invention herein involved, it is intended that all matter contained in the description thereof or shown in the accompanying drawings shall be interpreted as illustrative and not in a limiting sense.

I claim:

1. The combination of an article of manufacture having a surface bearing identifying characters of an alphabetical and numerical set produced in a form adapted to be recognized by human vision in accordance with their shapes and orientations, said characters being formed of character shape defining pixels selected from a predetermined available constant matrix having a predetermined number of rows of pixel positions extending from a top row to a bottom row, wherein each character is formed as a unique combination of a predetermined constant and equal number of said pixels.

2. The combination of claim 1 in which each of said characters exhibits a unique, character identifying pattern of said pixels within a predetermined number of said rows of said matrix extending from said top row.

3. The combination of claim 2 in which said predetermined number of rows having said unique, character identifying pattern of said pixels is three.

4. The combination of claim 1 in which each of said characters exhibits a unique, character identifying pattern of said pixels within a predetermined number of said rows of said matrix extending from said bottom row.

5. The combination of claim 4 in which said predetermined number of rows having said unique, character defining pattern of said pixels is three.

6. The combination of claim 2 in which:
each of said characters exhibits a unique, character identifying pattern of said pixels within a predetermined number of said rows of said matrix extending from said top row; and
each of said characters exhibits a unique, character identifying pattern of said pixels within a predetermined number of said rows of said matrix extending from said bottom row.

7. The combination of claim 6 in which said predetermined number of rows having said unique, character defining pattern of said pixels is three.

8. The combination of claim 1 in which said predetermined constant and equal number of said pixels is 18.

9. The combination of claim 8 in which said predetermined available matrix has seven said rows each having six available pixels.

10. The combination of claim 1 in which said predetermined constant and equal number of said pixels is 19.

11. The combination of claim 10 in which said predetermined available matrix has seven said rows each having six available pixels.

12. The combination of claim 1 in which said pixels are dot-like indentations formed within said surface.

13. The combination of claim 1 in which each said character is configured having at least one said pixel within each said matrix row.

14. The font of characters of an alphabetical and numerical set thereof as shown in FIG. 1.

15. The font of characters of an alphabetical and numerical set thereof as shown in FIG. 6.

16. The combination of an article of manufacture having a surface bearing a message string of identifying characters produced in a form adapted to be recognized by human vision in accordance with the orientations and shapes thereof, said characters of said string being formed of character shape defining pixels selected from a matrix having rows of pixel positions extending from a top row to a bottom row, wherein at least one character of said string is an encrypting character selected from a first character set, each character of which is configured as a unique combination of a first predetermined constant and equal number of said pixels, the position of said encripting character within said string being selected in accordance with a predetermined encryption procedure; the remainder of said characters of said string being selected from a second character set, each character of which is configured as a unique combination of a second predetermined constant and equal number of said pixels.

17. The combination of claim 16 in which each of said characters of said message string exhibits a unique, character identifying pattern of said pixels within a predetermined number of said rows of said matrix extending from said top row.

18. The combination of claim 17 in which said predetermined number of rows having said unique, character identifying pattern of said pixels is three.

19. The combination of claim 17 in which each of said characters of said message string exhibits a unique, character identifying pattern of said pixels within a predetermined number of said rows of said matrix extending from said bottom row.

20. The combination of claim 19 in which said predetermined number of rows having said unique, character defining pattern of said pixels is three.

21. The combination of claim 16 in which:
each of said characters of said message string exhibits a unique, character identifying pattern of said pixels within a predetermined number of said rows of said matrix extending from said top row; and
each of said characters of said message string exhibits a unique, character identifying pattern of said pixels within a predetermined number of said rows of said matrix extending from said bottom row.

22. The combination of claim 16 in which said string of pixels are dot-like indentations formed within said surface.

23. The combination of claim 16 in which said first predetermined constant and equal number of pixels is 18; and
  each of said characters of said message string exhibits a unique, character identifying pattern of said pixels within three consecutive said rows of said matrix extending from said top row.

24. The combination of claim 23 in which each of said characters of said message string exhibits a unique, character identifying pattern of said pixels within three consecutive said rows of said matrix extending from said bottom row.

25. The combination of claim 24 in which said second predetermined constant and equal number of pixels is 19.

26. The combination of claim 16 in which said first predetermined constant and equal number of pixels is 19; and
  each of said characters of said message string exhibits a unique, character identifying pattern of said pixels within three consecutive said rows of said matrix extending from said top row.

27. The combination of claim 26 in which each of said characters of said message string exhibits a unique, character identifying pattern of said pixels within three consecutive said rows of said matrix extending from said bottom row.

28. The combination of claim 27 in which said second predetermined constant and equal number of pixels is 18.

29. The method of marking the surface of an article with a secure character message string, comprising the steps of:
  selecting a predetermined number of the characters of said message string from a first font having characters which are of an alphabetical and numerical set produced in a form adapted to be recognized by human vision in accordance with their shapes and orientations, said characters being configured as a unique combination of a predetermined constant and equal first number of pixels arranged in rows from the top to the bottom of said characters and wherein each of said characters exhibits a unique, character identifying pattern within a predetermined number of said rows; and
  forming said pixels defining said selected characters upon said surface by creating dot-like indentations within said surface.

30. The method of claim 29 including the step of selecting at least one of the characters of said message string as an encripting character from a second font having characters configured as a unique combination of a predetermined constant and equal second number of pixels arranged in rows from the top to the bottom of said characters and wherein each of said characters exhibits a unique, character-identifying pattern within a predetermined number of said rows, said selection of said encripting character being in accordance with a secret encription procedure.

* * * * *